June 11, 1946.  G. L. WELLER, JR  2,401,782
FLOW CONTROL DEVICE
Filed April 16, 1942
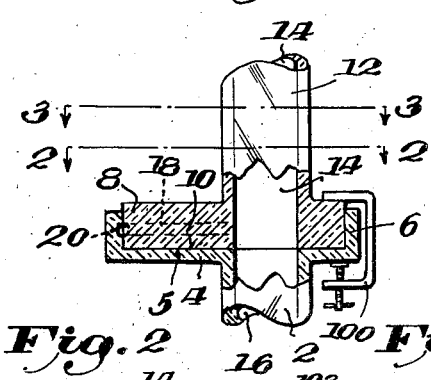
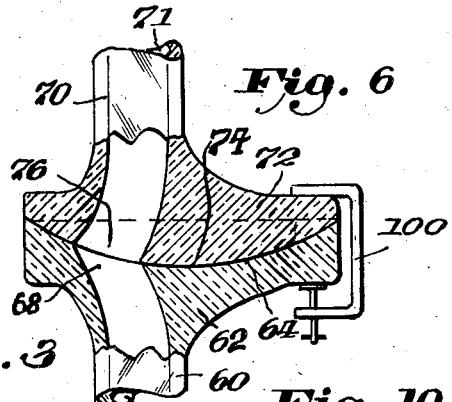
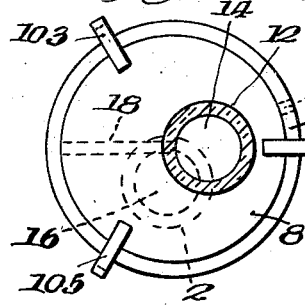
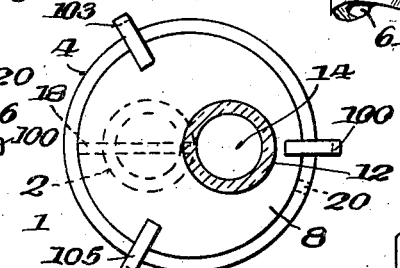
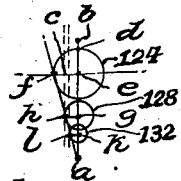
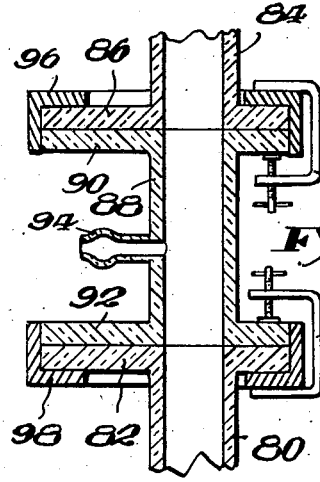
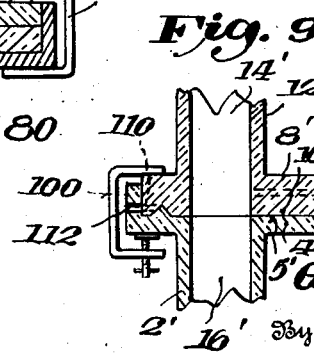
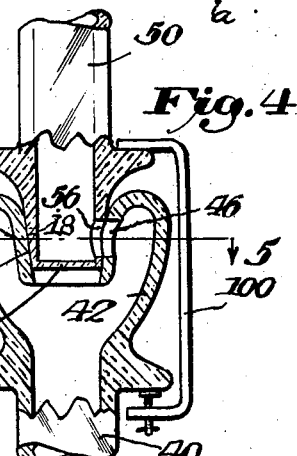
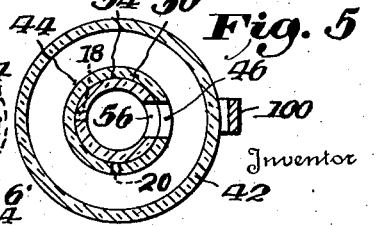
Inventor
George Louis Weller, Jr.
By Akul M. Pedersen
Attorney Patented June 11, 1946

2,401,782

UNITED STATES PATENT OFFICE 2,401,782

FLOW-CONTROL DEVICE

George Louis Weller, Jr., Washington, D. C.

Application April 16, 1942, Serial No. 439,252

2 Claims. (Cl. 251—84)

The present invention relates to a device for regulating flow or for cutting off flow through pipes or conduits or other apparatus without the use of cocks or other extraneous parts in the flow line and more particularly to a form of joint or union for pipes or conduits having integral valve means therein for regulating flow therethrough or for providing cut-off as may be desired.

The device hereinafter described is adapted for use in connection with distillation apparatus in which vapor is passed through a conduit to a liquid collecting means, also in connection with extraction apparatus, in which regulation of flow or complete cut-off may be required during extraction, as in the use of separatory funnels, for example, and for a variety of other uses as will appear from the following detailed description.

In connection with distillation apparatus, it is ordinarily necessary to include a valve in the system to permit cut-off when necessary during the distillation process. In connection with laboratory distillation processes it is necessary generally to use apparatus having a cut-off valve of the form having a ground-glass stopper in an enlarged ground-glass joint, the stopper being turned to provide a passageway therethrough or to cut off flow as may be required. Due to expansion by heat or to contraction by cold, such valves frequently become stuck and it becomes necessary to free the joint by striking the stopper portion with sharp blows or by applying heat to the outer surface of the joint to cause expansion of the outer portion away from the stopper. It frequently happens that the joints are broken in this manner and much valuable time is lost as a consequence, in addition to the loss of the apparatus.

The breakage of such valves is also frequent in connection with both physical and chemical quantitative determinations. In the quantitative determination of carbon in steel, for example, oxygen gas is passed over chips of the steel in a combustion chamber heated to a high temperature, by which the iron of the steel is oxidized and carbon dioxide is formed through the combustion of the carbon. The resulting carbon dioxide gas which is admixed with excess oxygen is usually passed through a tube containing calcium chloride in order to dry the gas, which is then passed into an absorbing agent for the absorption of the carbon dioxide. During the passage of oxygen over the highly heated steel, it frequently happens that the oxygen is absorbed so rapidly by the oxidation of the iron in the steel that a partial vacuum is formed in the apparatus and unless the cocks in the system are closed rapidly enough to prevent liquid from being sucked into the absorbing agent from liquid-containing portions of the apparatus, the determination is vitiated. In the short time available for closing the cocks, which are of the usual ground-glass form, it frequently happens that the cock becomes stuck in the joint and breakage of the stopper occurs in the effort to break it loose. As hereinafter explained, the valve joint of the present invention is adapted to be rapidly opened and closed without sticking and serve to overcome the difficulties formerly experienced in connection with such laboratory combustion determinations.

Similarly in connection with laboratory determinations in which separatory funnels are used, considerable difficulty has been experienced because of the sticking of the ordinary form of valve joint which is generally used. When it is desired to determine the amount of fatty acids in a soap, for example, the fatty acids are usually separated from the soap by the addition of a mineral acid in a separatory funnel, and the fatty acids are then extracted with a solvent, such as petrolic ether. The water solution containing salts settles to the bottom of the separatory funnel and is separated from the supernatant petrolic ether layer by permitting it to pass through the cock of the separatory funnel into a separate vessel or container. When the ether layer reaches the stem portion of the separatory funnel, the cock is turned to the closed position so that the petrolic ether layer remains in the separatory funnel. During this separation, it frequently happens that the cock of the separatory funnel becomes stuck because of a sudden change in temperature or possibly because of turning the cock with too much inward pressure, and it becomes necessary to loosen or free the cock in order to carry on the extraction process. In attempting to loosen the cock, breakage sometimes occurs and the determination must be repeated, resulting in loss of time and materials.

In the use of the ordinary form of ground glass cock or valve in connection with chemical apparatus, particularly where the joint is located at the side of a reaction vessel or chamber, there is a dead space which is not easily accessible to the chemicals or materials of the reaction chamber and in this space the desired reaction does not proceed as rapidly as in other more accessible portions of the apparatus. Furthermore when the cock or passageway therethrough is employed for introducing a chemical material into the reaction vessel, a certain amount of the material remains entrapped in the passageway through the cock and produces contamination in many cases when one of the reaction products is to be withdrawn from the reaction chamber through the dead space and the passageway in the stopper. By means of the valve joint of my invention as hereinafter described, the usual dead space is avoided and contamination of material withdrawn from the reaction vessel or chamber is substantially eliminated.

In commercial operation, in connection with distillation and other processes, various forms of apparatus have been devised in which a valve serves to regulate flow through a joint or union in a conduit, but such devices employ packing in order to prevent leakage through the valve and to permit cutting off flow without leakage therethrough. Such valves are not adapted for use in connection with laboratory apparatus or other apparatus in which the material in the reaction chamber would become contaminated by contact with packing material. In the making of chemical or physical determinations of components or constituents of materials to be analyzed, contact with foreign materials such as the usual packing material must be wholly avoided. Also in connection with bacteriological determinations or bacteriological experiments in which cultures are used, it is essential that contamination be wholly avoided. The valve joint of the present invention is particularly adapted for use in connection with apparatus in which contamination of material subjected to treatment must be entirely avoided. The valve joint of my invention is also particularly adapted for use in connection with apparatus in which the regulation of flow or cut off must be effected rapidly in the apparatus in which a reaction is being carried out. It is also particularly advantageous in connection with apparatus in which complete reaction would not be produced with the presence of a dead space as in the ordinary form of ground glass joint.

One of the objects of the present invention is to provide a form of flow regulating means by which flow through a union or joint may be regulated without the necessity of disturbing the position of other parts of the apparatus and without the use of the usual massive ground glass joints.

Another object of the invention is to provide a form of valve joint which may be rapidly operated and which will not become stuck because of temperature changes or other causes.

Another object of the invention is to provide a form of valve joint in which the flow of material through a conduit may be readily regulated without the use of extraneous apparatus in the flow line.

Another object of the invention is to provide a novel form of flow regulating means for a conduit without the use of packing material or substances in connection with the flow regulating means which might contaminate the liquid or material passing through the regulating means.

Another object of the invention is to provide a modified form of the valve joint of my invention by which flow between two conduits may be regulated by adjusting the relative position of the conduits to each other at the valve joint.

Another object of the invention is to provide a novel form of valve joint having valve means therein which may be readily shifted in position to regulate flow or to provide cut off without danger of binding action at the joint.

Another object of the invention is to provide a form of valve joint having valve means for regulating flow in a conduit without the use of packing or extraneous material to prevent leakage at the joint and having a structure serving to prevent leakage.

Another object of the invention is to provide a form of valve joint for regulating or arresting flow in a conduit having relief means which may be rapidly actuated to relieve pressure or partial vacuum in the system.

Another object of the invention is to provide a form of valve joint which may be so connected in the apparatus or system that a portion thereof may be readily removed without disturbing other parts of the apparatus for replacement by a similar part or by a part having other connections to permit certain operations for which the first part is unadapted.

Another object of the invention is to provide a form of valve joint which is particularly adapted for introducing measured quantities of materials into an apparatus or system, or withdrawing measured quantities therefrom without disturbing other parts of the apparatus or interfering with the reaction being carried out in the apparatus.

Another object of the invention is to provide a form of apparatus for carrying out chemical or physical reactions in which material may be introduced into or withdrawn from the apparatus without danger of contamination of the material in the apparatus or that withdrawn therefrom and in which there is no dead space in which unreacting material may lodge.

With these and other objects in view, the invention comprises the various features hereinafter more fully described and defined in the annexed claims.

The various features of the invention are illustrated in the accompanying drawing, in which:

Fig. 1 is a view in elevation, partly in section, showing the preferred embodiment of the valve joint of my invention;

Fig. 2 is a cross sectional view taken on the section line 2—2 of Fig. 1, showing in dotted lines the relative position of the conduit 2 with respect to the conduit 12 when the valve is partly open;

Fig. 3 is a cross sectional view taken on the section line 3—3 of Fig. 1, showing in dotted lines the relative position of the conduit 2 with respect to the conduit 12 when the valve is closed;

Fig. 4 is a cross sectional view in elevation of a modified form of my invention particularly adapted for use in feeding a measured quantity of liquid into a system or reaction chamber or for use with separatory funnels;

Fig. 5 is a cross sectional plan view taken on section line 5—5 of Fig. 4;

Fig. 6 is a cross sectional view in elevation of another modified form of my invention which permits movement of the valve sections to bring the conduits on opposite sides thereof into or out of alignment;

Fig. 7 is a cross sectional view in elevation showing a form of the invention in which one portion of the valve sections is removable for the substitution of another section having different connections or of different form;

Fig. 8 is a plan view of another modification of my invention in which a plurality of conduits are connected to each valve section;

Fig. 9 is a cross sectional view in elevation of a form of the invention similar to that of Fig. 1 but to which anti-leak are applied and means are provided to assist in separating the valve sections; and Fig. 10 illustrates a method for graphically determining the distances of the centers of the conduits from the center of a valve section in the form of the invention shown in Fig. 8.

Referring more in detail to the drawing, the preferred form of the invention which is illustrated in Fig. 1 comprises a conduit or conductor 2 which is provided with an enlarged disk portion 4 having an inner face 5 and an upstanding flange member 6. The disk member 4 engages a circular male disk member 8 having a face portion 10 adapted to engage the face 5 of the disk member 4. The disk member 8 is connected to a conduit or conductor 12 having a passageway 14 therein, the outlet of which in the disk portion 8 is positioned eccentrically with respect to the center or the axis of the disk 8. Similarly, the outlet of the passageway 16 through the conduit 2 is positioned eccentrically with respect to the center or axis of the disk member 4. By positioning the disk members 4 and 8 so that the outlets of the passageways 14 and 16 are in registration or axial alignment, the valve is in its full open position. By turning the valve sections or disk members 4 and 8 relatively so that the outlets of passageways 14 and 16 are in the relative positions shown by the full and dotted lines in Fig. 2 of the drawing, the passageway through the valve will be partly open, and it will be apparent that the degree of opening may be regulated within the limits of the full open and fully closed positions. By relatively positioning the outlets of the conduits 2 and 12 as indicated by the full and dotted positions shown in Fig. 3, in which the disk member 4 has been moved through 180 degrees from the position shown in Fig. 1, the valve will be in the fully closed position, in which flow through the conduits is fully cut off.

In order to provide for access to the atmosphere in the event that it is desired to release pressure from the system or to reduce a vacuum therein by admission of atmospheric air, a vent is provided comprising a passageway 18 through the disk member 8 and an opening 20 in the flange member 6. The passageway 18 preferably extends through the disk parallel to the face 5, passing through the line of centers of the conduit 12 and the disk 8 and connecting the passageway 14 with the opening 20 when the disk members are relatively turned into the proper positions for venting. The opening 20 is preferably located in the flange member in such a position that in the full open position of the valve, as shown in Fig. 1 of the drawing, the opening will be positioned at about an angle of 10 to 15 degrees in a clockwise direction from the passageway 18. In order to open the vent, it is necessary to turn the conduit 2, or the flange 20, in a clockwise direction, or opposite to the direction it is normally turned in order to open or close the valve from the position shown in Fig. 1 of the drawing.

The valve joint may be held in any desired position by the use of a suitable form of clamp. A form of clamp as shown may be used which may be loosened to change the position of the valve and again fastened in the adjusted position.

In the modified form of my invention illustrated in Fig. 4 of the drawing, a conduit 40 having an enlarged portion 42 and a return bend 44 is employed, the return bend having a lateral opening 46 through which flow may take place. The return bend 44 is preferably open at the lower extremity thereof, although if desired it may be closed. Cooperating with the return bend portion 44 is a pipe member 50 of a diameter corresponding substantially to the internal diameter of the return bend portion 44 so as to fit into the same. The pipe member 50 is preferably provided with a closed end portion 52 and a lateral opening 56 of a size corresponding substantially to that of the opening 46, so that when the pipe member is in a position so that the openings 46 and 56 are in registration, flow of fluid may take place between the conduits 40 and 50. By adjusting the position of the pipe 50 on its seat in the return bend portion 44 in an intermediate position, the degree of registration between the opening 56 and opening 46 may be regulated so as to control the flow through the openings to any desired rate. By turning the pipe member 50 beyond the point at which the opening 56 contacts with the opening 46, flow between the conduits 40 and 50 may be entirely cut off. This form of the invention, as illustrated in Figs. 4 and 5 of the drawing, may be made of glass, metal, or any suitable alloy or plastic composition having the desired chemical and physical properties depending on the use to which the valve joint is to be put. It is particularly adapted for use with a separatory funnel in which the valve joint as illustrated in Figs. 4 and 5 is used in place of the ordinary cock having a ground glass stopper in the enlarged joint. The vessel portion or container of the separatory funnel may have a stem as shown at 50 in Fig. 4, and the conduit 40 and return bend portion 44 may be a part of a vessel or container, such as an Erlenmeyer flask for example, or the conduit and return bend may be a separate part to be fitted into a stopper for use with a filtering flask, or suction flask, or any other suitable apparatus. The device may also be used as a means for admitting measured quantities of a liquid into a reaction chamber or system for carrying out reactions in either a continuous or batch process. It will be obvious that controlled feed into a system may be obtained by uniformly rotating the conduit 50 in the return bend portion 44 by mechanical means, although the specific means therefor is not a part of the present invention.

In another modified form of my invention as illustrated in Fig. 6 of the drawing, a curved or arcuate surface of contact is provided at the joint so as to permit modifying the position or angle of the conductors relative to each other while at the same time regulation of flow or cut off is accomplished as in the forms of the invention above described. In this form, a conduit or conductor 60 is provided with an enlarged portion 62 having an interior concave surface 64, preferably of spherical form throughout at least the contacting or peripheral portion of part 62. In the conduit 60 is a passageway 61 having an outlet opening 68 in the concave surface 64, the outlet being positioned eccentrically with respect to the center of the surface 64. Cooperating with the part 62 is a male member 72 having an outer convex surface 74 of a form corresponding to that of the concave surface 64, including preferably a spherical portion so as to allow the desired scope of movement between the parts. Connected to the enlarged portion 72 is a conduit 70 having a passageway 71 therein and an opening or outlet 76 located eccentrically with respect to the center of the convex surface 74. The passageways 61 and 71 are preferably curved in a lateral direction so that when the openings 68 and 76 are in registration, or in other words when the opening through the valve joint is in the full open position, the conduit 61 is in alignment with the conduit 71 in the main portions thereof. By turning the surfaces 64 and 74 relative to each other the flow of fluid through the valve joint may be regulated as desired, and by turning the part 72 relative to the part 62 so that the opening 76 no longer contacts with the opening 68, flow through the joint is completely cut off. It will be apparent also that by turning the part 72 into a position in which the main portion of the conductor 71 is at an angle to the main portion of the conductor 61, the valve joint may also be set to give the desired amount of registration between the openings 68 and 76 and thus provide any predetermined desired rate of flow through the joint. The adaptation of this form of the invention to numerous uses will be apparent to those skilled in the art without a description of specific applications thereof.

Fig. 7 of the drawing illustrates a form of the invention similar to that shown in Fig. 1 of the drawing except that the flange member 6 of Fig. 1 is omitted and the valve joint is provided in duplicate to permit the removal of a part thereof and substitution of another part without disturbing the remainder of the apparatus. In this form, a conduit 80 is connected to a disk member 82 and a conduit 84 is connected to a disk member 86, the conduits 80 and 84 being supported in position by any suitable means. Between the disk member 82 and the member 86 is a removable part 88 having an upper disk member 90 and a lower disk member 92 adapted to fit and cooperate with the disk members 86 and 82, respectively, to regulate the flow through the member 88. The member 88 may be provided with an outlet or part 94 which may be connected to another apparatus, or may be employed as a vent for relieving pressure in the system or admitting air thereto, or for introducing another material, as a liquid or gas, into the system. At the peripheral face of the disk members 86 and 90, and the corresponding peripheral face of the disk members 92 and 82, I preferably provide ring members 96 and 98 for holding the peripheral portions of the disks in alignment when the part 88 is turned for regulating flow through the apparatus or for providing cut off. Suitable forms of clamps, as 100, 102 may be employed for holding the ring members 96 and 98 and the disk members 86 and 90 and 92 and 82 in adjusted position.

It will be apparent that by loosening the clamp members 100 and 102, the removable part 88 may be turned into the positions as illustrated in Figs. 2 and 3 to regulate flow or to cut off flow as may be desired, and that the part 88 may be removed by dismounting the clamp members and withdrawing the ring members 96 and 98 in the direction of the adjacent conduits, whereby another part may be substituted for the part 88 having disk members 90 and 92 of similar form and spaced the same distance apart. It will also be apparent that another part may be substituted for the part 88 in which the distance of the disks similar to 90 and 92 is greater or less than that between the disks as illustrated provided that either the conduit 80 or the conduit 84 is moved a suitable distance so that the substituted part fits between the disk members 82 and 86. It will be obvious also that the intervening part 88 may be omitted entirely if desired by moving one of the parts 80 or 84 so that the face of the disk member 82 contacts with the corresponding face member of the disk 86. The flow from the conduit 80 to the conduit 84, or vice versa, may then be regulated or cut off by turning either the disk member 86 or 82 relative to the other, the parts being held in adjusted position by clamp members, as 100, 103 and 105, as shown in Figs. 2 and 3, and by a single ring member as 96, shown in Fig. 7.

In the event that the form of valve joint illustrated in Fig. 1 is to be used in connection with certain liquids which have a tendency to exude between the faces of the valve sections, I may employ anti-leak means, as one or more anti-leak rings 104, as illustrated in Fig. 9 of the drawing. For this purpose, I preferably employ a circular ring 104 having an angular upper face, the base of the ring being integral with the disk member 4'. Cooperating with the ring member 104 is an annular groove 106 in the face 10' of the disk member 8', the annular groove being of a form to closely fit the upper surface of the anti-leak ring so as to prevent leakage between the adjacent surfaces.

In order to permit separation of the valve sections from each other, by relieving the vacuum or suction between the adjacent surfaces 5' and 10', I preferably provide a passageway 110 from the periphery of the disk member 8' through the body of the disk member to the center portion of the annular groove 106 and a passageway or opening 112 passing through the flange member 6' in a position to register with the passageway 110 when turned into the proper relative positions for registration. The opening 112 in the flange member 6' is preferably located in a position beyond which registration would occur in the movement of the valve sections from closed to full open position of the conduits 14' and 16'.

A passageway 114 may also be provided in the flange member 6' so as to communicate with a passageway or vent 118 in the disk member 8', the vent being substantially parallel with the face 10' and connecting the conduit 14' with the peripheral portion of the disk member 8'. By properly locating the opening 114 in the flange member 6', air may be admitted to the surface of the anti-leak ring after communication of the conduit 14' with the atmosphere through the passageway 118 and opening 114, or prior thereto, or simultaneously therewith if desired.

In the various forms of the invention I preferably employ a clamp or clamp members, as 100, 103 and 105, although under some circumstances the clamps may be omitted, as in the use of the form of the invention shown in Fig. 4 for a combined separatory funnel and flask, for example.

In certain uses of the invention, it is desirable to regulate or control flow through a plurality of conduits simultaneously and to initiate and cut-off flow through the conduits at the same time, such as required for carrying out a reaction between liquids in a continuous process, or for controlling influx and efflux simultaneously to and from a chamber or container. For this purpose, a plurality of conduits, as 122, 126 and 130 may be connected to the valve sections or disk members 120 and 134, as illustrated in Fig. 8 of the drawing, by which flow through the passageways 124, 128 and 132 may be initiated simultaneously, regulated while maintaining proportionate flow, and cut-off simultaneously in the said conduits. The said conduits are connected to the disk members or valve sections at certain distances from the centers of the valve sections so that when the valve sections are turned or rotated in position relative to each other to regulate flow or to cut-off or initiate flow, the same operation will take place simultaneously in each of the conduits connected to the valve sections.

In order to determine the proper distances of the circular conduits from the center of the disk member, as illustrated in Fig. 8 of the drawing, and assuming that the volumes of the three liquids to be simultaneously controlled are in the ratios as represented by the areas of the openings 124, 128 and 132, the said distances from the center $a$ of the disk member 120 may be calculated mathematically, or they may be readily determined in the manner hereinafter explained in connection with Fig. 10 of the drawing.

Referring to Fig. 10, a line $a—b$ is first drawn of a length corresponding to the length of the radius of the valve section or disk member 120, the point $a$ representing the position of the center of the valve section and the point $b$ representing a point in the periphery of the said valve section. Assuming that the inner circle 124 represents the largest of the conduits connected to the valve section, its radius $c$ is then laid off along the line $a—b$ inwardly, beginning at a point $d$ near the periphery of the disk member, but at a sufficient distance therefrom to allow at least for the thickness of the wall of the conduit 122. The point $e$ at the end of the radial distance on the line $a—b$ then represents the relative position of the center of the conduit 124 from the center $a$ of the valve section 120 or 134. By drawing a circle with a radius equal to the length $a—e$ from the center $a$, the locus of the center $e$ of the conduit 124 is determined and may be located on any suitable portion of the said circle. By drawing a line $e—f$ at right angles to the line $a—b$ in Fig. 10 equal to the length of the radius of the circle 124, and connecting the point $f$ with the point $a$, the distances of the centers of other conduits in the valve section may then be readily found or determined. The radius of the circle 128 may be laid off, for example, along the line $e—f$ from the point $e$ and at the end of this line or radius a line may be drawn parallel to the line $a—b$ and intersecting the line $a—f$ at the point $h$. A line may then be drawn through the point $h$ parallel to the line $e—f$ intersecting the line $a—b$ at the point $g$. The line $h—g$ is then equal to the radius of the circle 128 and the distance $g—a$ is the distance that the center of the conduit 128 should be located from the center $a$ of the valve section 120. In a similar way, the radius of the circle 132 may be laid off on the line $e—f$ from the point $e$ in Fig. 10, and a line may be drawn through the end of the radius parallel to the line $a—b$ intersecting the line $a—f$ at a point $l$. A line may then be drawn from the point $l$ parallel to the line $e—f$ intersecting the line $a—b$ at a point $k$. The line $l—k$ is then equal to the radius of the circle 132 and the distance $k—a$ then represents the distance that the center of the conduit should be positioned from the center $a$ of the valve section 120.

It will be understood that the ratios $e—f/e—a$; $g—h/g—a$; and $k—l/k—a$ are all equal, being corresponding sides of similar triangles, and the distances $e—a$, $g—a$ and $k—a$ when laid off in suitable directions from the center $a$ of the valve section or disk member 120 then determine the positions of the centers of the conduits in which simultaneous initiation and cut-off of flow takes place, together with proportionate flow having the same flow ratio in intermediate positions of the valve. It is apparent that as the valve sections are moved relative to each other, to obtain regulation of flow through the conduits the volume of flow is increased or decreased in proportion in the conduits so that the volume ratio remains constant or substantially constant if the viscosity of the liquids passing through the conduits is substantially the same.

It will be understood that the valve sections having multiple conduits may be used to maintain regulated flow in a constant ratio with flow occurring in one direction in one or some of the conduits and flow in the opposite direction in others or the remaining conduits. The form of the invention illustrated in Fig. 8 may be used, for example, for the continuous purification of the water in swimming pools, fresh water being continuously supplied through the conduit 128, chlorine solution or other purifying agent being supplied through the conduit 132 and a corresponding volume of water being continuously withdrawn from the tank through the conduit 124. For this purpose the combined areas of the conduits 128 and 132 may be equal to the area of the opening or conduit 124.

It will be understood that various changes or modifications may be made in the various forms of the invention as above described as will be apparent to those skilled in the art without departing from the spirit of scope of the invention as defined in the claims annexed hereto.

Having thus described the invention, what is claimed as new is:

1. A valve for regulating and cutting off flow through a conduit without the use of packing or screw connections in the valve body which comprises a valve body composed of two stationary valve sections and a removable valve section mounted between said stationary sections, said removable section comprising a body portion and upper and lower disk members connected thereto, said disk members having upper and lower flat faces, said stationary sections having corresponding lower and upper disk portions with flat surfaces adapted to contact said upper and lower flat faces to provide two pairs of abutting interfacial surfaces, an opening extending through said body portion of the removable valve section between said upper and lower flat faces, a conduit connected to each of said stationary sections, openings in each of said flat surfaces positioned eccentrically therein and communicating with said conduits, said openings in said surfaces and said faces being so positioned and related that by rotating the said removable section in place between the said stationary valve sections the openings may be brought into registration for full open position of the valve, or partly in registration, or in non-registration for complete cut-off, an outlet communicating with said opening through the body portion of the removable section to admit fluid to or remove fluid from said body portion without otherwise disturbing the set of the valve and removable clamp members for holding each pair of abutting interfacial surfaces in pressure contact for preventing leakage therethrough.

2. A valve for regulating and cutting off flow through a conduit without the use of packing or screw connections in the valve body which comprises a valve body composed of two stationary valve sections and a removable valve section mounted between said stationary sections, said removable section comprising a body portion and upper and lower disk members connected thereto, said disk members having upper and lower flat faces, said stationary sections having corresponding lower and upper disk portions with flat surfaces adapted to contact said upper and lower flat faces to provide two pairs of abutting interfacial surfaces, an opening extending through said body portion of the removable valve section between said upper and lower flat faces, a conduit connected to each of said stationary sections, openings in each of said flat surfaces positioned eccentrically therein and communicating with said conduits, said openings in said surfaces and said faces being so positioned and related that by rotating the said removable section in place between the said stationary valve sections the openings may be brought into registration for full open position of the valve, or partly in registration, or in non-registration for complete cut-off and means for holding each pair of abutting interfacial surfaces in pressure contact for preventing leakage therethrough.

GEORGE LOUIS WELLER, Jr.